(12) United States Patent
Shah et al.

(10) Patent No.: US 7,263,568 B2
(45) Date of Patent: Aug. 28, 2007

(54) INTERRUPT SYSTEM USING EVENT DATA STRUCTURES

(75) Inventors: Hemal V. Shah, Austin, TX (US); Gary Y. Tsao, Austin, TX (US); Ali S. Oztaskin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 10/815,902

(22) Filed: Mar. 31, 2004

(65) Prior Publication Data

US 2005/0228920 A1 Oct. 13, 2005

(51) Int. Cl.
*G06F 13/24* (2006.01)
*G06F 15/16* (2006.01)

(52) U.S. Cl. ............... 710/267; 710/263; 710/268; 710/243; 710/260; 709/250; 370/412

(58) Field of Classification Search ......... 710/260–269
See application file for complete search history.

(56) References Cited

U.S. PATENT DOCUMENTS

| | | | | |
|---|---|---|---|---|
| 5,214,759 | A * | 5/1993 | Yamaoka et al. ............ | 709/213 |
| 5,471,618 | A | 11/1995 | Isfeld | |
| 5,557,744 | A * | 9/1996 | Kobayakawa et al. ...... | 709/232 |
| 5,564,005 | A | 10/1996 | Weber et al. | |
| 5,566,337 | A * | 10/1996 | Szymanski et al. ......... | 710/260 |
| 6,760,783 | B1 * | 7/2004 | Berry .......................... | 719/318 |
| 6,792,483 | B2 * | 9/2004 | Schmidt ....................... | 710/48 |
| 6,804,631 | B2 | 10/2004 | Kelley et al. | |
| 7,010,633 | B2 * | 3/2006 | Arndt et al. ................. | 710/243 |
| 2001/0037397 | A1 | 11/2001 | Boucher et al. | |
| 2002/0152327 | A1 * | 10/2002 | Kagan et al. ................ | 709/250 |
| 2003/0065856 | A1 * | 4/2003 | Kagan et al. ................ | 710/263 |
| 2004/0017819 | A1 * | 1/2004 | Kagan et al. ................ | 370/412 |
| 2004/0027374 | A1 * | 2/2004 | Cirne et al. .................. | 345/744 |
| 2004/0103225 | A1 | 5/2004 | McAlpine et al. | |
| 2004/0237093 | A1 | 11/2004 | Stuiman et al. | |
| 2005/0228922 | A1 * | 10/2005 | Tsao et al. ................... | 710/268 |

(Continued)

OTHER PUBLICATIONS

Buonadonna, P., and D.Culler, "Queue Pair IP: A Hybrid Architecture for System Area Networks", Proceedings of the 29th Annual International Symposium on Computer Architecture, 2002, pp. 247-256.*

(Continued)

*Primary Examiner*—Paul R. Myers
*Assistant Examiner*—Brian Misiura
(74) *Attorney, Agent, or Firm*—Janaki K. Davda; Konrad Raynes & Victor LLP

(57) ABSTRACT

Provided are techniques for interrupt processing. An Input/Output device determines that an event has occurred. The Input/Output device determines a state of an event data structure. The Input/Output device writes an event entry into the event data structure in response to determining that the event has occurred. After writing the event entry, the Input/Output device determines whether to generate an interrupt or not based on the state of the event data structure.

Additionally provided are techniques for interrupt processing in which an I/O device driver determines that an interrupt has occurred. The I/O device driver reads an event entry in an event data structure in response to determining that the interrupt has occurred. The I/O device driver updates a state of a structure state indicator to enable/disable interrupts.

36 Claims, 8 Drawing Sheets

U.S. PATENT DOCUMENTS

| | | |
|---|---|---|
| 2006/0004983 A1 | 1/2006 | Tsao et al. |
| 2006/0133396 A1 | 6/2006 | Shah et al. |
| 2006/0149919 A1 | 7/2006 | Arizpe et al. |

OTHER PUBLICATIONS

Rangarajan, M., A. Bohra, K. Banerjee, E.V. Carrera, and R. Bianchini, "TCP Servers: Offloading TCP Processing in Internet Servers. Design, Implementation, and Performance", Technical Report, Rutgers University, 2002, pp. 1-14.*

Stevens, R. W., "UNIX Network Programming", 1990, pp. 209-210.*

"Virtual Interface Architecture Specification", Draft Revision 1.0, Dec. 4, 1997, 83 pp.*

U.S. Appl. No. 11/106,824, filed Apr. 15, 2005.

IEEE Standard for Information Technology 802.3, Part 3: Carrier Sense Multiple Access with Collision Detection (CSMA/CD) Access Method and Physical Layer Specifications; Institute of Electrical and Electronics Engineers, Inc., Mar. 8, 2002; 33 pp.

IEEE Std. 802.11b-1999, "Wireless LAN Medium Access Control (MAC) and Physical Layer (PHY) Specifications . . . ," Institute of Electrical and Electronics Engineers, Inc., Sep. 16, 1999; 17 pp.

PCI Local Bus Specification Rev. 2.3: PCI Engineering Change Notice—MSI-X, Jun. 10, 2003; Summary pp. 1-2; Chapter 6, "Configuration Space," pp. 189-209.

PCI Specifications, PCI-SIG 2004; web pages including Mar. 20, 2002 news release "PCI-SIG Releases New PCI Version 2.3 Local Bus Specification for Migration to Low-Voltage Designs," 18 pp. Available from the Internet at <URL: http://www.pcisig.com>.

Weber, et al., "Fibre Channel (FC) Frame Encapsulation," Network Working Group, RF C:3643, Dec. 2003; 17 pp.

Culley, et al. "Marker PDU Aligned Framing for TCP Specification (Version 1.0)," Release Specification of the RDMA Consortium; Oct. 25, 2002; 32 pp.

Hilland, et al. "RDMA Protocol Verbs Specification (Version 1.0)," Release Specification of the RDMA Consortium; Apr. 2003; 243 pp.

Recio, et al. "An RDMA Protocol Specification (Version 1.0)," Release Specification of the RDMA Consortium; Oct. 2002; 60 pp.

Shah, et al. "Direct Data Placement over Reliable Transports (Version 1.0)," Release Specification of the RDMA Consortium; Oct. 2002; 35 pp.

Anderson, Don, et al., eds. "PCI System Architecture," 4th ed.; TOC pp. v-xlii; Intro. pp. 1-6; Chapter 1 pp. 7-13; Chapter 2 pp. 15-21; 1999.

Window Platform Design Notes, "Interrupt Architecture Enhancements in Microsoft Windows . . . ," © 2003 Microsoft Corporation; 42 pp.

Deyring, K. (Ed.), "Serial ATA: High Speed Serialized AT Attachment", Rev. 1.0, Aug. 29, 2001, 36 pp.

Infiniband, "InfiniBand Architecture Specification vol. 1", Release 1.0, Oct. 24, 2000, Ch. 1-8, pp. 1-195.

Infiniband, "InfiniBand Architecture Specification vol. 1", Release 1.0, Oct. 24, 2000, Ch. 9-10, pp. 196-445.

Infiniband, "InfiniBand Architecture Specification vol. 1", Release 1.0, Oct. 24, 2000, Ch. 11-14, pp. 446-669.

Infiniband, "InfiniBand Architecture Specification vol. 1", Release 1.0, Oct. 24, 2000, Ch. 15-20, pp. 670-880.

Infiniband, "InfiniBand Architecture Specification vol. 2", Release 1.0, Oct. 24, 2000, Ch. 1-11, pp. 1-319.

Infiniband, "InfiniBand Architecture Specification vol. 2", Release 1.0, Oct. 24, 2000, Ch. 12-Appendix D, pp. 320-623.

EP Office Action, Feb. 9, 2006, for International Application No. 03 812 441.8-22111.

PCT International Search Report, Aug. 9, 2004, for International Application No. PCT/US03/37254.

Penokie, G.O. (Ed.), "Information Technology-SCSI Controller Commands-2 (SCC-2)", T10/Project 1225D, Revision 4, Sep. 12, 1997, 24 pp.

RDMA Consortium, "Architectural Specifications for RDMA over TCP/IP", [online], 2005, [retrieved on Dec. 22, 2005], retrieved from the Internet at <URL: http://www.rdmaconsortium.org/home>.

Salzmann, T., and M. Peppel, "GTO Driving Protection Technique with Status Monitoring", IEEE Transactions on Industry Applications, vol. 24, Issue 1, Part 1, 1998, pp. 115-120. [Abstract].

U.S. First Office Action, Mar. 10, 2006, for U.S Appl. No. 10/816,435.

Wangdee, W. and R. Billinton, "Utilization of Time Varying Event-based Customer Interruption Cost Load Shedding Schemes", 2004 International Conference on Probabilistic Methods Applied to Power Systems, Sep. 2004, pp. 769-775. [Abstract].

* cited by examiner

INTERRUPT SYSTEM USING EVENT DATA STRUCTURES

BACKGROUND

In conventional systems, Input/Output (I/O) devices use interrupts to notify a host stack of various events, such as transmit/receive completions. An interrupt may be described as a signal from a device attached to a computer or from a program executing on the computer that causes the operating system of the computer to stop current processing and handle the interrupt. An I/O device may be described as a device that is part of a host system and that is attached to an I/O fabric. The host system uses I/O devices in performing I/O operations (e.g., network I/O operations, storage I/O operations, etc.). A host stack may be described as software that includes applications, libraries, drivers, and an operating system that run on host processors (Central Processing Units or "CPUs") of a host system.

In some systems, upon an interrupt from an I/O device, an I/O device driver executing at the host system runs an Interrupt Service Routine (ISR) that checks the state of an I/O device interrupt for each I/O device, one at a time. Then, if a particular I/O device generated the interrupt, the ISR disables interrupts so that the same I/O device cannot generate another interrupt, acknowledges the interrupt, processes the interrupt, and enables interrupts so that the I/O device can generate another interrupt. Typically, an I/O device has registers for interrupt status/cause, masking, and acknowledgement. Thus, the ISR performs an I/O read of the register across a bus for interrupt status/cause to determine whether a particular I/O device generated the interrupt and to determine the type of interrupt. The ISR performs I/O writes across the bus to the register for masking to disable and enable the interrupts. Additionally, the ISR performs an I/O write across the bus to the register for acknowledgement to acknowledge the interrupt. I/O reads and I/O writes go across the bus connecting the I/O device to the host system. Such I/O reads and I/O writes across the bus for interrupt processing may degrade system performance and result in interrupt processing latency and system overhead. Also, the I/O reads and I/O writes may be Memory Mapped I/O (MMIO) reads/writes.

Notwithstanding conventional techniques for interrupt processing, there is a need in the art for improved interrupt processing.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Embodiments describe an event data structure based interrupt processing scheme for I/O devices, such as high performance I/O devices. The event data structure based scheme may be used by any I/O device to communicate events with the host stack. In certain embodiments, the event data structure is an event queue, thus, in certain embodiments, an event queue based interrupt scheme is provided.

Figure 1:
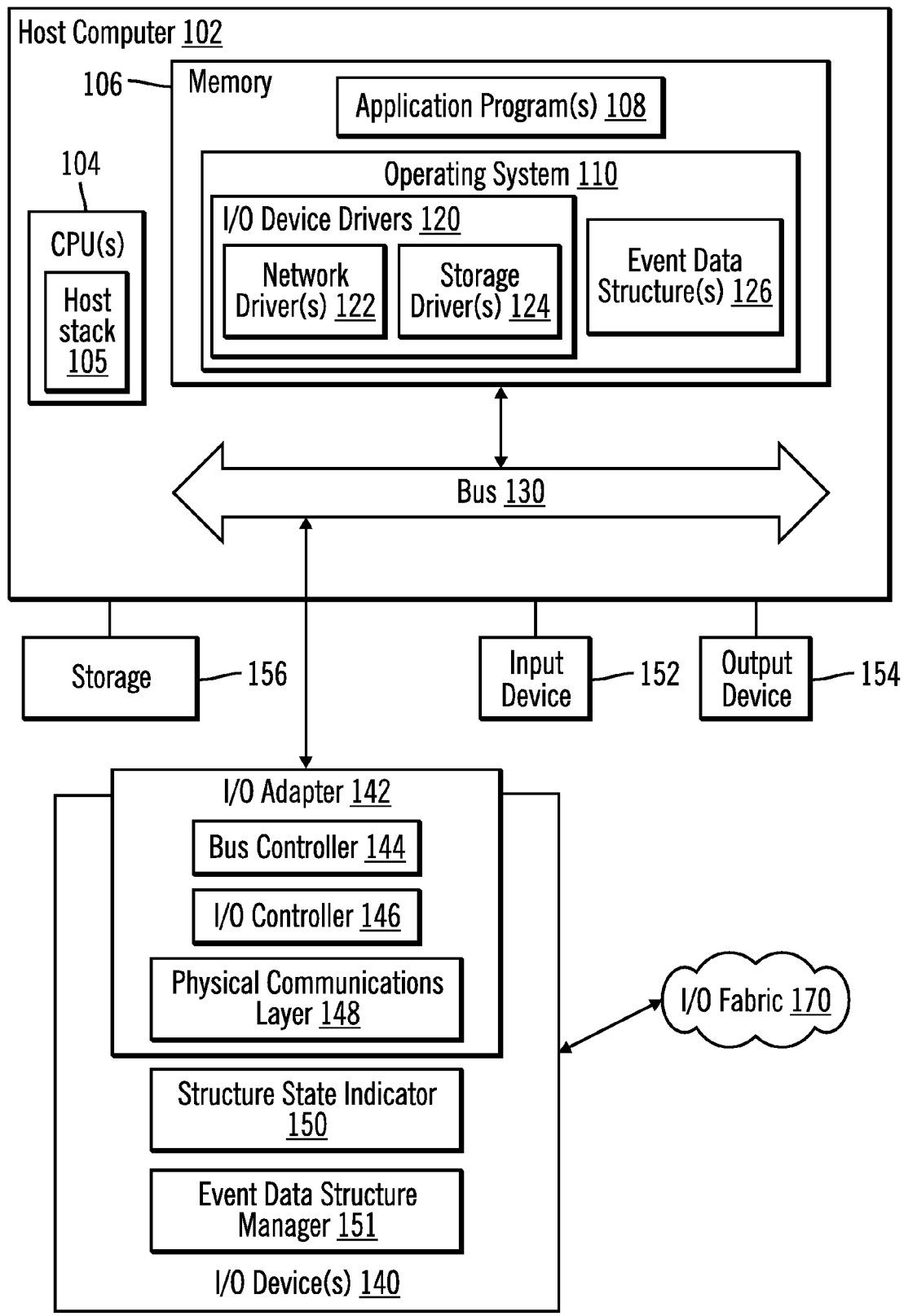
FIG. 1 illustrates computer system in accordance with certain embodiments.

FIG. 1 illustrates a computing environment in which embodiments may be implemented. A host computer 102 is connected to one or more I/O devices 140 via a bus 130. Any number of I/O devices may be attached to host computer 102.

Host computer 102 includes one or more central processing units (CPUs) 104, a volatile memory 106, non-volatile storage 156 (e.g., magnetic disk drives, optical disk drives, a tape drive, etc.), and one or more I/O devices 140. A host stack 105 executes on at least one CPU 104.

One or more application programs 108 and an operating system 110 reside in memory 106 and execute on one or more CPUs 104. Operating system 110 includes I/O device drivers 120. The I/O device drivers 120 include one or more network drivers 122 and one or more storage drivers 124 that reside in memory 106 during execution. The network drivers 122 and storage drivers 124 may be described as types of I/O device drivers 120. Also, one or more event data structures 126 are in memory 106.

The I/O device driver 120 includes I/O device specific commands to communicate with each I/O device 140 and interfaces between the operating system 110 and each I/O device 140. The I/O device 140 and I/O device drivers 120 implement logic to process I/O functions.

Each I/O device 140 includes various components implemented in the hardware of the I/O device 140. Each I/O device 140 is capable of transmitting and receiving packets of data over I/O fabric 170, which may comprise a Local Area Network (LAN), the Internet, a Wide Area Network (WAN), Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Each I/O device 140 includes an I/O adapter 142, a structure state indicator 150, and an event data structure manager 151. In certain embodiments, an I/O adapter 142 is a Host Bus Adapter (HBA). In particular, an I/O adapter 142 includes bus controller 144, I/O controller 146, and physical communications layer 148. A bus controller 144 enables each I/O device 140 to communicate on a computer bus 130, which may comprise any bus interface known in the art, such as a Peripheral Component Interconnect (PCI) bus or PCI express bus (PCI Special Interest Group, PCI Local Bus Specification, Rev 2.3, published March 2002), etc. The I/O controller 146 implements functions used to perform I/O functions. The physical communication layer 148 implements functionality to send and receive network packets to and from remote data storages over an I/O fabric 170. In certain embodiments, the I/O adapters 142 may implement the Ethernet protocol (IEEE std. 802.3, published Mar. 8, 2002), Fibre Channel (IETF RFC 3643, published December 2003), or any other networking and storage protocol known in the art.

The I/O device 140 also includes a structure state indicator 150 (which in some embodiments may be a "doorbell register"). In certain embodiments, the structure state indicator 150 is a register.

Each I/O device 140 includes an event data structure manager 151 that is responsible for updating the appropriate event data structure 126 and performing other tasks.

The host computer 102 may comprise a computing device known in the art, such as a mainframe, server, personal computer, workstation, laptop, handheld computer, etc. Any CPU 104 and operating system 110 may be used. Programs and data in memory 106 may be swapped into and out of storage 156 as part of memory management operations. The storage 156 may comprise an internal storage device or an attached or network accessible storage. Programs in the storage 156 are loaded into the memory 106 and executed by the CPU 104. An input device 152 and an output device 154 are connected to the host computer 102. The input device 152 is used to provide user input to the CPU 104 and may be a keyboard, mouse, pen-stylus, microphone, touch sensitive display screen, or any other activation or input mechanism known in the art. The output device 154 is capable of rendering information transferred from the CPU 104, or other component, at a display monitor, printer, storage or any other output mechanism known in the art.

In certain embodiments, in addition to the I/O device drivers 120, the host computer 102 may include other drivers. The I/O devices 140 may include additional hardware logic to perform additional operations to process received packets from the host computer 102 or the I/O fabric 170. Further, the I/O devices 140 may implement a transport layer offload engine (TOE) to implement the transport protocol layer in the I/O device as opposed to the I/O device drivers 120 to further reduce host computer 102 processing burdens. Alternatively, the transport layer may be implemented in the VO device drivers 120 or other drivers (for example, provided by an operating system).

Various structures and/or buffers (not shown) may reside in memory 106 or may be located in a storage unit separate from the memory 106 in certain embodiments.

Figure 2:
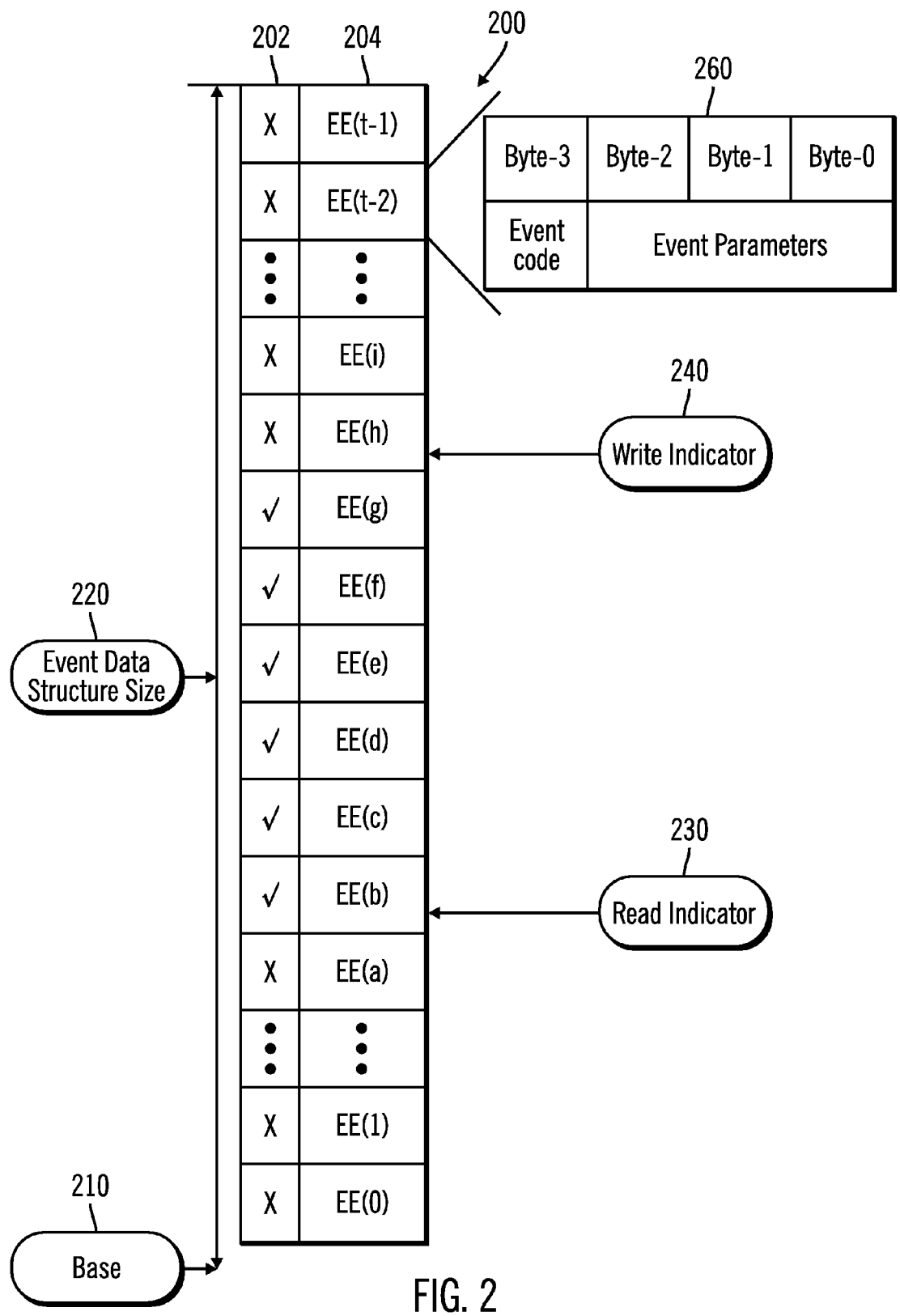
FIG. 2 illustrates an event data structure in accordance with certain embodiments.

FIG. 2 illustrates an event data structure 200 in accordance with certain embodiments. Event data structure 200 is an example of event data structures 126 (FIG. 1). One or more event data 200 may be shared by a host stack and an I/O device 140. Event data structures 200 are used by I/O device 140 to communicate various events to the host stack. The event data structure 200 resides in host computer 102 memory 106. A base 210 defines a starting address of the event data structure. The size of the event data structure, in terms of event entries, is defined by the event data structure size 220.

Each element of the event data structure 200 is referred to as event entry (EE). Each event entry has an event code field 202 and event specific parameters 204. This eliminates the need for I/O reads for retrieving event information upon receipt of an interrupt. The event code identifies the interrupt source or function (e.g., a global event or a channel event). Also, the event entry may include additional information, such as read and/or write indicator values, connection context identifier, work or completion data structure identifier. The event data structure 200 may have variable event entries, and each event entry may be z-bytes in size. For example, event entry 260 illustrates an example of a 4-byte event entry in which byte-3 is used to store the event code 202, while bytes 2, 1, and 0 are used to store the event parameters 204.

The event data structure 200 is organized as a circular buffer, written by an I/O device 140 and read by an I/O device driver 120. The I/O device 140 may write entries into the event data structure 200 for various reasons, such as errors, channel events, global events, manageability events, etc. The I/O device 140 generates an interrupt depending upon the state of the event data structure 200. Initially, both the I/O device 140 and the I/O device driver 120 point to the first event entry in the event data structure 200. The I/O device 140 writes event specific information in the event entry indicated by the write indicator 240 (e.g., a pointer) and advances the write indicator 240 after writing an event entry to the event data structure 200. Similarly, when the I/O device driver 120 retrieves an event entry, the I/O device driver 120 advances the read indicator 230. In certain embodiments, the write indicator 240 and read indicator 230 values are stored in registers.

The event data structure 200 may be either physically contiguous or virtually contiguous. The I/O device 140 performs a virtual to physical address translation for the location indicated by the write indicator 240 when the event data structure is virtually contiguous.

Thus, with event data structures 126, the I/O device 140 acts as a producer, while the I/O device driver 120 acts as the consumer. When an I/O device 140 wishes to signal an interrupt, the I/O device 140 first places an event entry into an event data structure 126. The I/O device 140 also updates the write indicator, and, in some cases, sends an interrupt message. For example, for Message Signal Interrupt (MSI)/MSI-X based interrupts, the I/O device 140 sends the interrupt message with an associated vector, and, for PCI based interrupts, the I/O device 140 sends the interrupt message by asserting INTx#. Also, there may be "interrupt coalescing" or interrupt moderation schemes applied in the I/O device 140 before each interrupt, depending on the interrupt latency requirement. In this interrupt scheme, the interrupt service routine or post processing after the interrupt service routine at the I/O device driver 120 uses a single MMIO write to re-enable interrupts, instead of using 1 MM I/O read plus up to 2 MMIO writes, as in conventional systems.

In certain embodiments, each I/O device 140 includes an event data structure manager that is responsible for updating the appropriate event data structure 126, updating the write indicator 140 (e.g., with a lazy update at a later time than the time at which the event data structure 126 is updated), and sending the interrupt.

The I/O device 140 maintains an event data structure state, while the I/O device driver 120 controls the "to state" state transitions. These transitions are initiated by writing the desired state transition encoding to a structure state indicator 150. The structure state indicator 150 is an I/O address used by the host stack to communicate event data structure state values and read indicator values to the I/O device 140.

Figure 3:
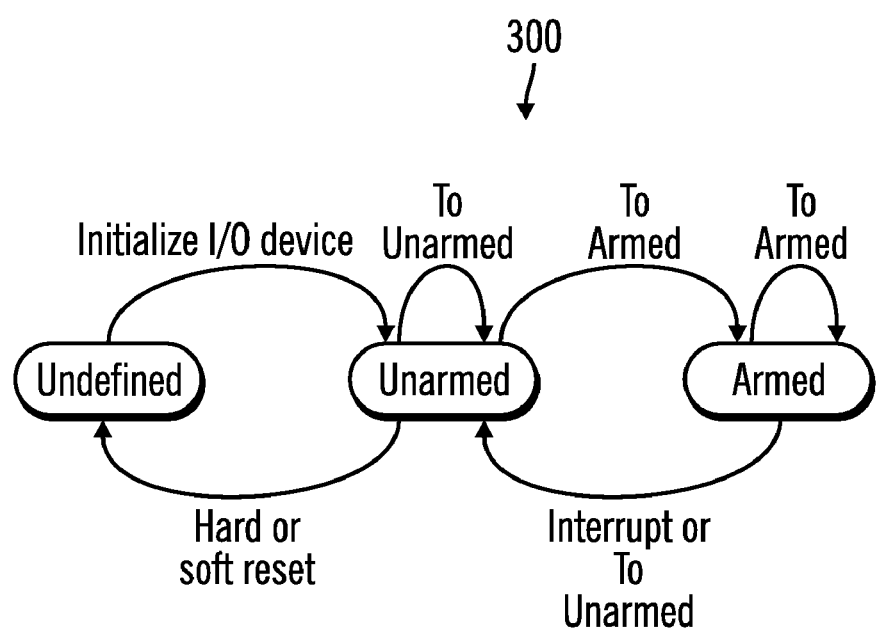
FIG. 3 illustrates a state transition diagram in accordance with certain embodiments.

FIG. 3 illustrates a state transition diagram 300 in accordance with certain embodiments. Diagram 300 shows event data structure states and state transitions. There are three states: undefined, unarmed, and armed.

The power-on default is the "undefined" state. The undefined state reflects the undefined status of the event data structure 126. If the I/O device 140 desires to post (i.e., write) an "event" and finds the event data structure state as undefined, the I/O device 140 shuts down. The I/O device 140 may also cause the event data structure 126 to enter the undefined state if, for example, a catastrophic error is detected (e.g., event data structure overflow). In the undefined state, no event entry is written in the event data structure 126.

In the "unarmed" state, the I/O device 140 posts events to the event data structure 126 whenever desired, but the I/O device 140 does not signal an event data structure interrupt, which may be described as an interrupt signaling that an event entry has been written to the event data structure. Event data structure 126 overflows may also be detected while in the unarmed state. In certain embodiments, the event data structure 126 is large enough to avoid overflows during normal operation. In certain embodiments, upon detecting an overflow, the I/O device 140 may either shut down or signal an out-of-band event to resize the event data structure 126. Thus, if there is an overflow, the event data structure 126 may be resized. In certain embodiments, if there is an overflow, the I/O device 140 and device driver 120 may switch to using a larger event data structure 126. Also, in the unarmed state, if there is a "read indicator update," the state loops back to the unarmed state.

In the "armed" state, the I/O device 140 posts events to the event data structure 126 whenever desired. However, if the write indicator 240 is already ahead, or advances ahead, of the read indicator 230 and (optionally) an interrupt moderation timer expires, the I/O device 140 signals an event data structure interrupt and transitions the event data structure state to the unarmed state. Event data structure overflows may also be detected while in the armed state.

From the undefined state, when the I/O device driver 120 allocates memory for the event data structure 126 and notifies the I/O device of the location of the event data structure 126 (illustrated as "initialize I/O device"), there is a transition to the unarmed state. From the unarmed state, when the I/O device driver 120 enables an I/O device 140 to generate interrupts, there is a transition to the armed state. The state transition from the armed state to the unarmed state (illustrated as "Interrupt or to Unarmed") is taken simultaneously with signaling of an event data structure interrupt by an I/O device 140.

Figure 4:
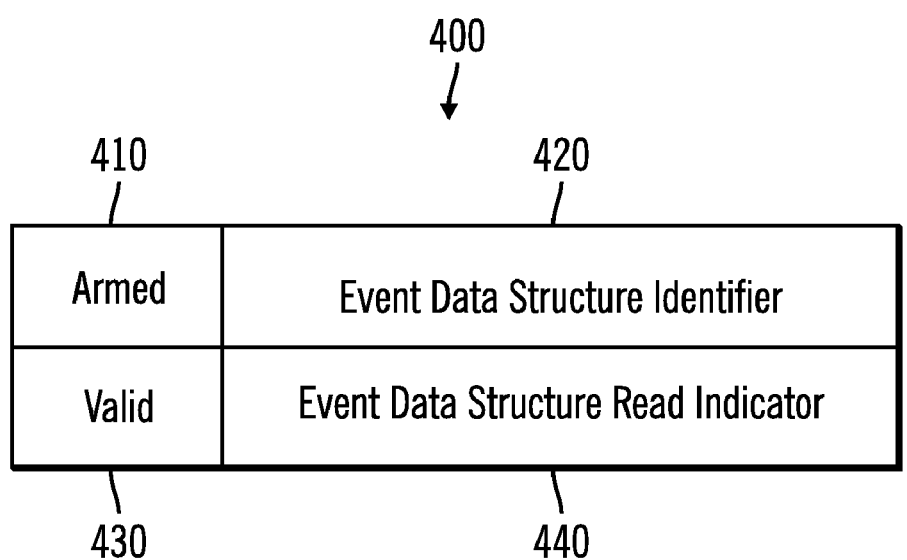
FIG. 4 illustrates a structure state indicator in accordance with certain embodiments.

The structure state indicator 150 is used by the I/O device driver 120 to communicate event data structure state transitions and the value of the read indicator 230. The structure state indicator 150 may be an I/O register maintained by the I/O device 140, which may be either memory mapped or I/O mapped. FIG. 4 illustrates a structure state indicator 400 in accordance with certain embodiments. Structure state indicator 400 is an example of a structure state indicator 150. The fields of the structure state indicator 400 are: armed, event data structure number, valid, and event data structure read indicator. The armed field 410 indicates whether the event data structure 126 should be armed or unarmed. In certain embodiments, the armed field 410 is a flag. The event data structure number field 420 provides an identifier of the event data structure 126. The valid field 430 indicates whether the event data structure read indicator is valid or not. In certain embodiments, the valid field 430 is a flag. The event data structure read indicator field 440 represents the current event data structure read indicator value. In some cases, an event entry may be read by the I/O device driver 120, but the read indicator may be updated at a later time, so the valid field value may be set to not valid to indicate that the value of the read indicator field is not valid.

Figure 5:
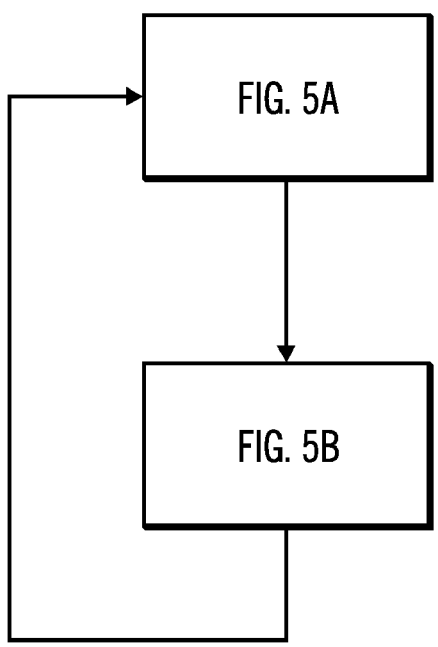
FIG. 5 illustrates a relationship between FIGS. 5A and 5B in accordance with certain embodiments.
Figure 5A:
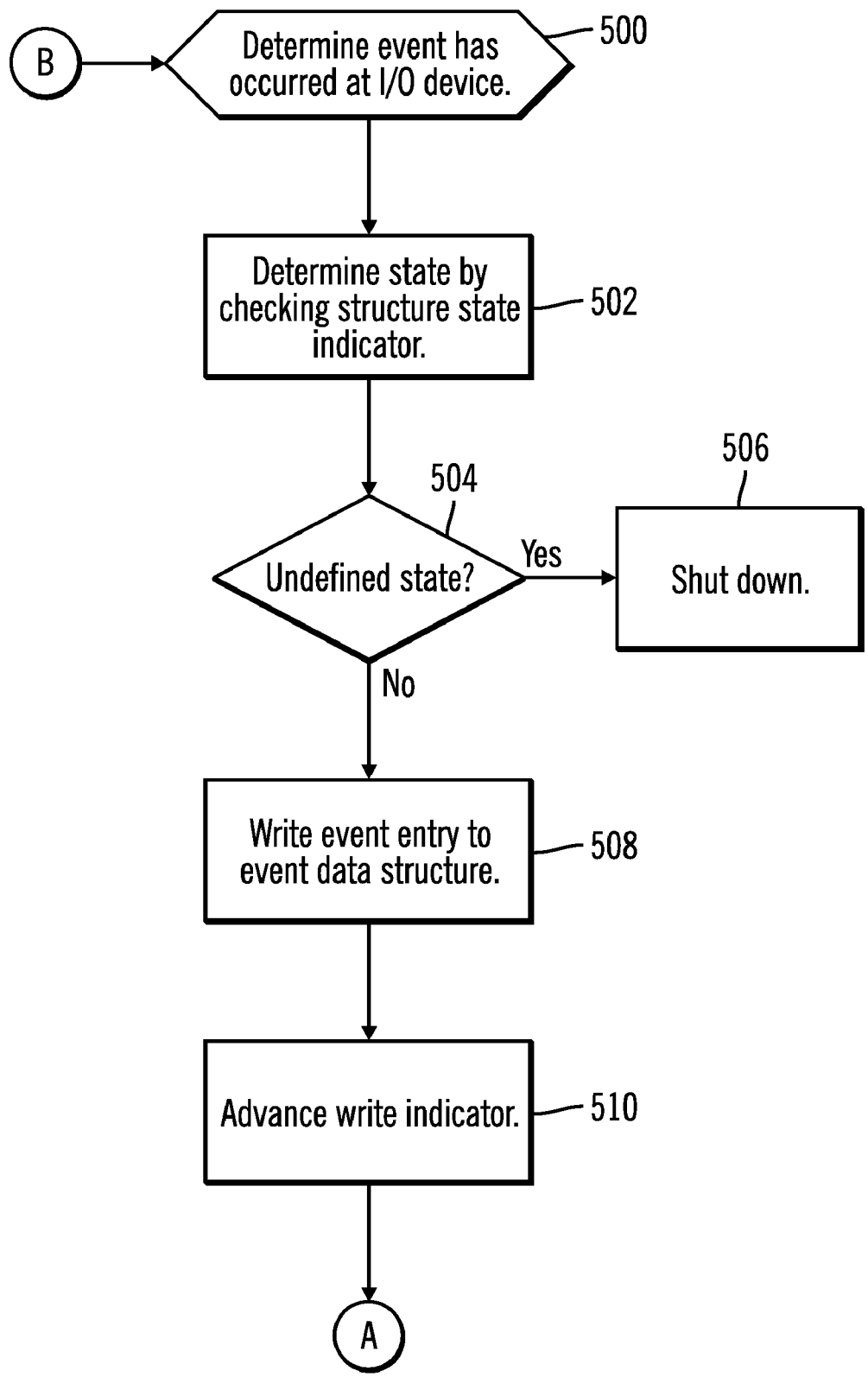
FIGS. 5A and 5B illustrate operations performed by an I/O device for processing an event in accordance with certain embodiments.
Figure 5B:
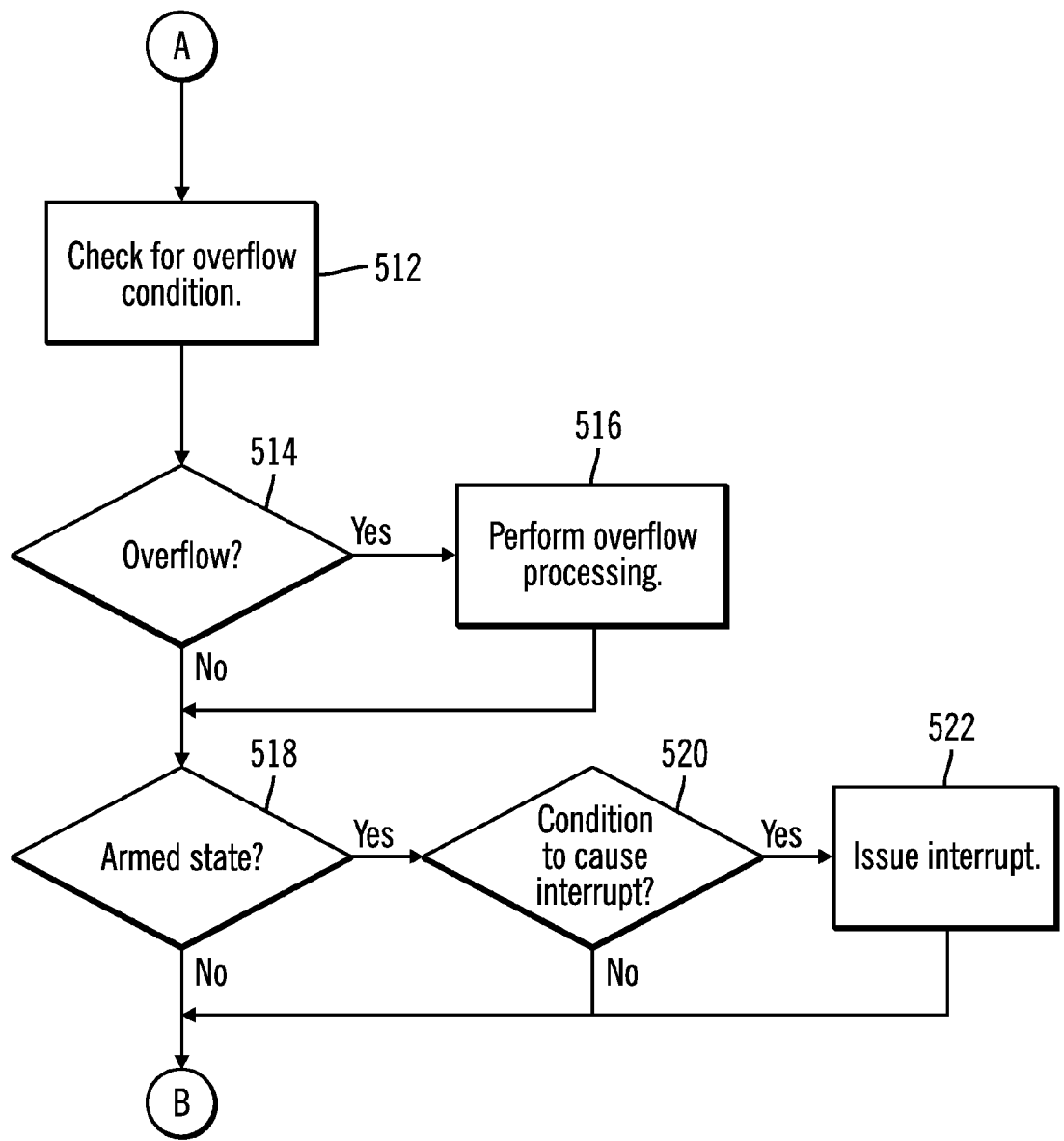

FIGS. 5A and 5B (whose relationship is shown in FIG. 5) illustrate operations performed by an I/O device 140 for processing an event in accordance with certain embodiments. In FIG. 5, it can be seen that processing may flow from FIG. 5A to FIG. 5B and then back to FIG. 5A. In FIG. 5A, control begins at block 500 with the I/O device 140 determining that an event has occurred. In block 502, the I/O device 140 determines the state of the event data structure 126 by checking the structure state indicator 150. In block 504, the I/O device 140 determines whether the state is an undefined state. If so, processing continues to block 506, otherwise, processing continues to block 508. In block 506, the I/O device 140 shuts down.

In block 508, the I/O device 140 writes an event entry to the event data structure 126. In block 510, the I/O device 140 advances the write indicator, and processing continues to block 512 (FIG. 5B). In block 512, the I/O device 140 checks for an overflow condition. In block 514, the I/O device 140 determines whether overflow has occurred. If so, processing continues to block 516, otherwise, processing continues to block 518. In block 516, the I/O device 140 performs overflow processing, such as resizing the event data structure 126 or switching to a larger event data structure 126, and processing continues to block 518.

In block 518, the I/O device 140 determines whether the state is an armed state. If so, processing continues to block 520, otherwise, processing loops back to block 500 (FIG. 5A). In block 520, the I/O device 140 determines whether there is a condition that exists to cause an interrupt. If so, processing continues to block 522, otherwise, processing loops back to block 500 (FIG. 5A). In block 522, the I/O device 140 issues an interrupt, and processing loops back to block 500.

Figure 6:
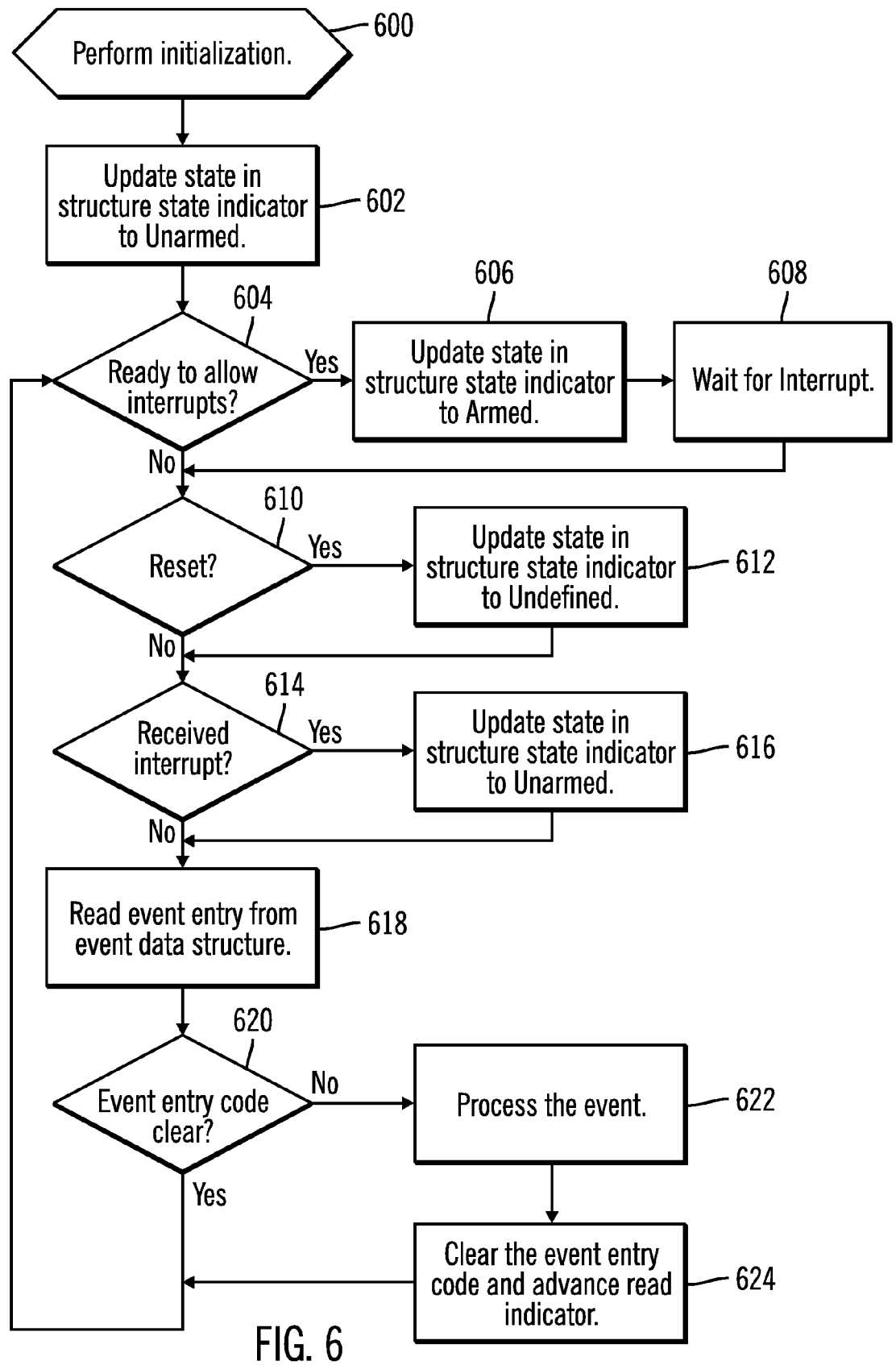
FIG. 6 illustrates operations performed by an I/O device driver in accordance with certain embodiments.

FIG. 6 illustrates operations performed by an I/O device driver 120 in accordance with certain embodiments. Control begins at block 600 with the I/O device driver 120 performing initialization (e.g., allocating memory for one or more event data structures 126 and notifying the I/O device 140 of the location of the one or more event data structures 126). In block 602, the I/O device driver 120 updates the state in the structure state indicator 150 to unarmed. In block 604, the I/O device driver 120 determines whether it is ready to allow interrupts. If so, processing continues to block 606, otherwise, processing continues to block 610. In block 606, the I/O device driver 120 updates the state in the structure state indicator 150 to armed. In block 608, the I/O device driver 120 waits for an interrupt.

In block 610, the I/O device driver 120 determines whether a reset has occurred. If so, processing continues to block 612, otherwise, processing continues to block 614. In block 612, the I/O device driver 120 updates the state the structure state indicator 150 to undefined.

In block 614, the I/O device driver 120 determines whether an interrupt has been received. If so, processing continues to block 616, otherwise, processing continues to block 618. In block 616, the I/O device driver 120 updates the state in the structure state indicator 150 to unarmed.

In block 618, the I/O device driver 120 reads an event entry from the event data structure. In block 620, the I/O device driver 120 determines whether the event entry code is clear. In certain embodiments, if an event entry code is clear, it may have a first value (e.g., zero), and, if the event entry code is not clear, it may have a second value (e.g., 1). If not, processing continues to block 622, otherwise, processing continues to block 604. In block 622, the I/O device driver 120 processes the event. In block 624, the I/O device driver 120 clears the event entry code (e.g., changes the value of the event entry code) and advances a read indicator.

In certain embodiments, if resizing or switching of event data structure 126 is desired, instead of updating the read indicator 230 to an absolute location, the read indicator 230 may be advanced by a number of locations. With this technique, a thread in host stack may advance the read indicator 230, while another thread is switching the event data structure 126, without acquiring any lock. With this technique, switching the event data structure 126 may be done in an atomic way through an administrative command.

During normal operation, the event data structure 126 will continuously loop between the unarmed and armed states. When the I/O device driver 120 is ready to receive an event data structure interrupt, the I/O device driver 120 arms the event data structure 126 (i.e., by setting the event data structure state to armed), and when the I/O device 140 signals an event data structure interrupt, the event data structure 126 is armed (i.e., by setting the event data structure state to unarmed). The I/O device driver 120 may implement any technique to determine when to arm the event data structure 126 (e.g., arm after one or more event entries have been read). The arming and unarming of the event data structure 125, along with proper advancement of the write indicator 240 and read indicator 230, throttles the event data structure interrupt signaling rate. Although the I/O device 140 is said to generate the event data structure interrupt, in certain embodiments, the event data structure interrupt is generated by a Remote Direct Memory Access (RDMA) Network Interface Controller (RNIC).

Certain embodiments provide polling. In particular, the event code field 202 of event entries are cleared when the event data structure 126 is created. When the I/O device driver 120 retrieves an event from the event data structure 126, the I/O device driver clears that event entry's code field 202. The I/O device driver 120, instead of reading the write indicator 240, which may be costly, is able to check the next event entry's code field 202. If that code field 202 is non-zero, then the next event entry is a valid event entry. Although in certain embodiments, the code field may be zero (event entry not valid) or non-zero (event entry valid), other codes may be used to indicate whether or not an event entry is valid. After processing that next event, the I/O device driver checks the next event entry location, and may repeat this process until finding a code field 202 with a value of zero. In this manner, more events are processed, including events posted after the interrupt, but prior to arming the event data structure 126 again). This is yet another technique of interrupt moderation and is illustrated with FIG. 6, for example, in blocks 604, 610, 612, 614, 618–624. In certain embodiments, the I/O device driver 120 may also control the polling overhead by periodically polling the event data structure entries rather than continuously polling the event data structure entries.

Moreover, by using multiple event data structures 126 per I/O device 140, the events for different I/O device functions (e.g. management, Transmission Control Protocol (TCP) offload, RDMA offload, Media Access Control (MAC)) may be separated. Also, by using multiple event data structures 126 and dynamically mapping each event data structure 126 to a processor, the interrupt processing may be parallelized, and the interrupt load may be dynamically balanced. This technique may be used for both line-based (e.g., legacy PCI INTx) and Message Signal Interrupt (MSI)/MSI-X based interrupts. When multiple event data structures 126 are used with MSI-X, event data structure based interrupt processing further results in performance improvement by avoiding serialized interrupt signaling. With MSI-X and multiple event data structures 126, interrupts may be signaled in parallel.

Thus embodiments provide the use of system memory resident (virtually contiguous) event data structures for communicating event information. The I/O device performs a write into an event data structure to provide event information instead of the I/O device driver performing an I/O read to obtain interrupt information. By reading event data structure entries, the I/O device driver is able to determine the I/O device that generated the interrupt and the cause of the interrupt. Therefore, use of the event data structure based interrupt processing scheme eliminates the I/O read operation for reading the cause of an interrupt cause as the event information is written by the I/O device in the system memory resident event data structure.

Also, the I/O device driver is able to control the interrupt rate by using the arming/disarming mechanism of the event data structure. This allows interrupt coalescing/moderation to be controlled by the I/O device driver instead of the I/O device. This results in better interrupt coalescing/moderation mechanism as the driver has a better view of system load at any given time.

By using multiple event data structures per I/O device, the events for different I/O device functions (e.g. management, TCP offload, RDMA offload, MAC) may be separated. Moreover, the event data structure based mechanism scales well with the system memory and processors. In particular, the event data structure size is dependent on the amount of system memory resources available and multiple event data structures may be used to parallelize interrupt processing. By using multiple event data structures and dynamically mapping each event data structure to a processor, the interrupt processing may be parallelized and the interrupt load can be dynamically balanced.

Embodiments enable building I/O devices, such as MAC/TOE/RNIC, and offer a high-performance interrupt processing scheme. The scheme may be used for various interrupts, such as I/O device-to-processor, controller-to-processor, processor-to-processor, chipset-to-processor interrupts.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Field Programmable Gate Array (FPGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The illustrated operations of FIGS. 5 and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for interrupt processing, comprising:
   determining that an event has occurred;
   determining a state of an event data structure, wherein the event data structure includes one or more entries, and wherein each of the entries is capable of storing event specific parameters and an event code field that identifies at least one of an event source and function of an Input/Output (I/O) device;
   writing an event entry into the event data structure in response to determining that the event has occurred and based on the state of the event data structure being one of armed or unarmed; and
   issuing an interrupt in response to determining that the state of the event data structure is armed and that a condition exists to cause an interrupt.

2. The method of claim 1, wherein interrupts are not issued when the state of the event data structure is unarmed.

3. The method of claim 1, further comprising:
   shutting down in response to determining that the state of the event data structure is undefined.

4. The method of claim 1, further comprising:
   checking a structure state indicator to determine the state of the event data structure.

5. The method of claim 1, further comprising:
   advancing a write indicator in the event data structure;
   checking for an overflow condition; and
   processing the overflow condition in response to determining that an overflow condition exists.

6. A method for interrupt processing, comprising:
   determining that an interrupt has occurred;
   reading an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device;
   updating a state of a structure state indicator to unarmed to indicate that interrupts are not allowed;
   determining whether an event code for the event entry that was read is clear; and processing an event in response to determining that the event code is not clear.

7. A method for interrupt processing, comprising:
   determining that an interrupt has occurred;
   reading an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device; and
   updating a state in a structure state indicator to unarmed in response to determining that the interrupt has occurred.

8. The method of claim 7, further comprising:
   determining whether to allow interrupts;
   updating the state in a structure state indicator to armed in response to determining that interrupts are to be allowed; and
   waiting for an interrupt.

9. The method of claim 6, further comprising:
   determining whether a reset has occurred; and
   updating the state in the structure state indicator to undefined in response to determining that the reset has occurred.

10. The method of claim 6, further comprising:
    initializing the event data structure;
    notifying an I/O device of the location of the event data structure; and
    updating the state of the structure state indicator to unarmed.

11. The method of claim 6, further comprising:
    clearing the event code for the event entry; and
    advancing a read indicator for the event data structure.

12. The method of claim 6, further comprising:
    generating multiple event data structures for one I/O device, wherein events for different I/O device functions are associated with one of the multiple event data structures; and
    dynamically mapping each of the multiple event data structures to a processor.

13. A system for interrupt processing, comprising:
    an Input/Output device coupled to a bus; and
    circuitry at the Input/Output device operable to:
       determine that an event has occurred;
       determine a state of an event data structure, wherein the event data structure includes one or more entries, and wherein each of the entries is capable of storing event specific parameters and an event code field that identifies at least one of an event source and function of the Input/Output (I/O) device;
       write an event entry into the event data structure in response to determining that the event has occurred and based on the state of the event data structure being one of armed or unarmed; and
       issue an interrupt in response to determining that the state of the event data structure is armed and that a condition exists to cause an interrupt.

14. The system of claim 13,
    wherein interrupts are not issued when the state of the event data structure is unarmed.

15. The system of claim 13, wherein the circuitry is operable to:
    shut down in response to determining that the state of the event data structure is undefined.

16. The system of claim 13, wherein the circuitry is operable to:
    check a structure state indicator to determine the state of the event data structure.

17. The system of claim 13, wherein the circuitry is operable to:
   advance a write indicator in the event data structure;
   check for an overflow condition; and
   process the overflow condition in response to determining that an overflow condition exists.

18. A system for interrupt processing, comprising:
   an Input/Output device driver coupled to a bus; and
   circuitry at the Input/Output device driver operable to:
      determine that an interrupt has occurred;
      read an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device;
      update a state of a structure state indicator to unarmed to indicate that interrupts are not allowed;
      determine whether an event code for the event entry that was read is clear; and
      process an event in response to determining that the event code is not clear.

19. A system for interrupt processing, comprising:
   an Input/Output device driver coupled to a bus; and
   circuitry at the Input/Output device driver operable to:
      determine that an interrupt has occurred;
      read an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device; and
   update a state in a structure state indicator to unarmed in response to determining that the interrupt has occurred.

20. The system of claim 19, wherein the circuitry is operable to:
   determine whether to allow interrupts;
   update the state in a structure state indicator to armed in response to determining that interrupts are to be allowed; and
   wait for an interrupt.

21. The system of claim 18, wherein the circuitry is operable to:
   determine whether a reset has occured; and
   update the state in the structure state indicator to undefined in response to determining that the reset has occurred.

22. The system of claim 18, wherein the circuitry is operable to:
   initialize the event data structure;
   notify an I/O device of the location of the event data structure; and
   update the state of the structure state indicator to unarmed.

23. The system of claim 18, wherein the circuitry is operable to:
   clear the event code for the event entry; and
   advance a read indicator for the event data structure.

24. The system of claim 18, wherein the circuitry is operable to:
   generate multiple event data structures for one I/O device, wherein events for different I/O device functions are associated with one of the multiple event data structures; and
   dynamically map each of the multiple event data structures to a processor.

25. An article of manufacture for interrupt processing, wherein the article of manufacture at an Input/Output device is operable to:
   determine that an event has occurred;
   determine a state of an event data structure, wherein the event data structure includes one or more entries, and wherein each of the entries is capable of storing event specific parameters and an event code field that identifies at least one of an event source and function of the Input/Output (I/O) device;
   write an event entry into the event data structure in response to determining that the event has occurred being one of armed or unarmed; and
   issuing an interrupt in response to determining that the state of the event data structure is armed and that a condition exists to cause an interrupt.

26. The article of manufacture of claim 25, wherein interrupts are not issued when the state of the event data structure is unarmed.

27. The article of manufacture of claim 25, wherein the article of manufacture is operable to:
   shut down in response to determining that the state of the event data structure is undefined.

28. The article of manufacture of claim 25, wherein the article of manufacture is operable to:
   check a structure state indicator to determine the state of the event data structure.

29. The article of manufacture of claim 25, wherein the article of manufacture is operable to:
   advance a write indicator in the event data structure;
   check for an overflow condition; and
   process the overflow condition in response to determining that an overflow condition exists.

30. An article of manufacture for interrupt processing, wherein the article of manufacture at an Input/Output device driver is operable to:
   determine that an interrupt has occurred;
   read an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device;
   update a state of a structure state indicator to unarmed to indicate that interrupts are not allowed;
   determine whether an event code for the event entry that was read is clear; and
   process an event in response to determining that the event code is clear.

31. An article of manufacture for interrupt processing, wherein the article of manufacture at an Input/Output device driver is operable to:
   determine that an interrupt has occurred;
   read an event entry in an event data structure in response to determining that the interrupt has occurred, wherein the event data structure includes one or more entries, and wherein each of the entries is capable of storing event specific parameters and an event code field that identifies at least one of an event source and function of an Input/Output (I/O) device; and update a state in a structure state indicator to unarmed in response to determining that the interrupt has occurred.

32. The article of manufacture of claim 31, wherein the article of manufacture is operable to:
determine whether to allow interrupts;
update the state in a structure state indicator to armed in response to determining that interrupts are to be allowed; and
wait for an interrupt.

33. The article of manufacture of claim 30, wherein the article of manufacture is operable to:
determine whether a reset has occurred; and
update the state in the structure state indicator to undefined in response to determining that the reset has occurred.

34. The article of manufacture of claim 30, wherein the article of manufacture is operable to:
initialize the event data structure;
notify an I/O device of the location of the event data structure; and
update the state of the structure state indicator to unarmed.

35. The article of manufacture of claim 30, wherein the article of manufacture is operable to:
clear the event code for the event entry; and
advance a read indicator for the event data structure.

36. The article of manufacture of claim 30, wherein the article of manufacture is operable to:
generate multiple event data structures for one I/O device, wherein events for different I/O device functions are associated with one of the multiple event data structures; and
dynamically map each of the multiple event data structures to a processor.

* * * * *